(12) United States Patent
Brischetto et al.

(10) Patent No.: US 10,539,083 B2
(45) Date of Patent: Jan. 21, 2020

(54) METHOD AND SYSTEM FOR DETERMINING ENGINE OPERATION PARAMETER VALUES DURING A GEAR SHIFT OPERATION

(71) Applicant: Scania CV AB, Södertälje (SE)

(72) Inventors: Mathias Brischetto, Hägersten (SE); Susanna Jacobsson, Huddinge (SE); Ola Stenlåås, Södertälje (SE)

(73) Assignee: Scania CV AB, Södertälje (SE)

( * ) Notice: Subject to any disclaimer, the term of this patent is extended or adjusted under 35 U.S.C. 154(b) by 88 days.

(21) Appl. No.: 15/769,051

(22) PCT Filed: Nov. 18, 2016

(86) PCT No.: PCT/SE2016/051145
§ 371 (c)(1),
(2) Date: Apr. 17, 2018

(87) PCT Pub. No.: WO2017/086873
PCT Pub. Date: May 26, 2017

(65) Prior Publication Data
US 2018/0298833 A1 Oct. 18, 2018

(30) Foreign Application Priority Data
Nov. 18, 2015 (SE) ...................................... 1551488

(51) Int. Cl.
*F02D 41/02* (2006.01)
*B60W 30/188* (2012.01)
(Continued)

(52) U.S. Cl.
CPC ........... *F02D 41/023* (2013.01); *B60W 10/06* (2013.01); *B60W 10/11* (2013.01);
(Continued)

(58) Field of Classification Search
CPC .. F02D 41/023; F02D 41/0007; F02D 11/105; F02D 2250/38; F02D 2250/18;
(Continued)

(56) References Cited

U.S. PATENT DOCUMENTS

| 5,534,764 A | * | 7/1996 | Masaki | ..................... B60L 3/00 318/802 |
| 2004/0106498 A1 | | 3/2004 | Badillo et al. | |

(Continued)

FOREIGN PATENT DOCUMENTS

| DE | 19962963 A1 | 6/2001 |
| EP | 2821624 A1 | 1/2015 |

OTHER PUBLICATIONS

International Search Report for PCT/SE2016/051145 dated Jan. 17, 2017.
(Continued)

*Primary Examiner* — Joseph J Dallo
(74) *Attorney, Agent, or Firm* — Moore & Van Allen PLLC; W. Kevin Ransom

(57) ABSTRACT

The present invention relates to a method for determining engine operation parameter values during and/or after a gear shift operation prior to performing said gear shift operation. The method comprises the steps of, prior to the gear shift operation: determining initial conditions comprising torque demand and engine speed and certain other engine operation parameter values; providing said initial conditions to an engine operation simulation model; providing a torque development course as well as an engine speed development course during the intended gear shift operation to said engine operation simulation model; and determining desired engine operation parameter values by means of said engine operation simulation model based upon the information thus provided to said engine operation simulation model.

20 Claims, 6 Drawing Sheets

(51) Int. Cl.
- *F02D 11/10* (2006.01)
- *F02D 41/00* (2006.01)
- *B60W 50/00* (2006.01)
- *B60W 10/06* (2006.01)
- *B60W 10/11* (2012.01)
- *F16H 61/04* (2006.01)
- *F02D 41/14* (2006.01)

(52) U.S. Cl.
CPC ...... *B60W 30/188* (2013.01); *B60W 50/0097* (2013.01); *F02D 11/105* (2013.01); *F02D 41/0007* (2013.01); *F16H 61/0437* (2013.01); B60W 2050/0039 (2013.01); B60W 2510/068 (2013.01); B60W 2510/0628 (2013.01); B60W 2510/0638 (2013.01); B60W 2510/0671 (2013.01); B60W 2510/0676 (2013.01); B60W 2510/1005 (2013.01); B60W 2540/10 (2013.01); B60W 2550/12 (2013.01); B60W 2710/0605 (2013.01); B60W 2710/0616 (2013.01); B60W 2710/0638 (2013.01); B60W 2710/0644 (2013.01); B60W 2710/0694 (2013.01); F02D 2041/1412 (2013.01); F02D 2041/1433 (2013.01); F02D 2200/1004 (2013.01); F02D 2200/60 (2013.01); F02D 2250/18 (2013.01); F02D 2250/38 (2013.01); Y02T 10/144 (2013.01)

(58) Field of Classification Search
CPC ......... F02D 2200/60; F02D 2200/1004; F02D 2041/1433; F02D 2041/1412; B60W 10/11; B60W 10/06; B60W 50/0097; B60W 30/188; B60W 2510/0671; B60W 2510/0628; B60W 2050/0039; B60W 2710/0694; B60W 2710/0644; B60W 2710/0638; B60W 2710/0616; B60W 2710/0605; B60W 2550/12; B60W 2540/10; B60W 2510/1005; B60W 2510/068; B60W 2510/0676; B60W 2510/0638; F16H 61/0437; Y02T 10/144
See application file for complete search history.

(56) References Cited

U.S. PATENT DOCUMENTS

| | | | |
|---|---|---|---|
| 2005/0193988 A1* | 9/2005 | Bidner | F01L 13/00 123/481 |
| 2007/0026995 A1* | 2/2007 | Doering | F02D 37/02 477/107 |
| 2010/0250081 A1* | 9/2010 | Kinser | B60T 8/00 701/70 |
| 2011/0045948 A1 | 2/2011 | Doering et al. | |
| 2013/0144581 A1* | 6/2013 | Johnson | B60W 30/1843 703/8 |
| 2014/0121896 A1 | 1/2014 | Valeri et al. | |
| 2014/0142822 A1 | 5/2014 | Li | |
| 2015/0047607 A1* | 2/2015 | Glugla | F02P 5/145 123/406.23 |
| 2015/0012192 A1 | 8/2015 | Xu et al. | |
| 2015/0330503 A1* | 11/2015 | Sujan | F16H 61/16 701/55 |
| 2016/0016525 A1* | 1/2016 | Chauncey | B60R 16/0236 701/123 |
| 2016/0281616 A1* | 9/2016 | Hippalgaonkar | F02D 29/02 |
| 2016/0281845 A1* | 9/2016 | Pietron | F16H 61/061 |
| 2016/0281846 A1* | 9/2016 | Hippalgaonkar | F16H 61/12 |
| 2016/0312884 A1* | 10/2016 | Meyer | F16H 61/0213 |
| 2017/0089450 A1* | 3/2017 | Barone | F04B 49/065 |
| 2017/0316125 A1* | 11/2017 | Jacobson | G06F 16/254 |
| 2018/0362017 A1* | 12/2018 | Meyer | B60W 20/15 |
| 2019/0047544 A1* | 2/2019 | Ye | B60W 20/11 |

OTHER PUBLICATIONS

Written Opinion of the International Searching Authority for PCT/SE2016/051145 dated Jan. 17, 2017.
Scania CV AB, International Application No. PCT/SE2016/051145, International Preliminary Report on Patentability, dated May 22, 2018.
Scania CV AB, European Application No. 16866758.2, Extended European Search Report, dated Jun. 26, 2019.
Scania CV AB, Korean Application No. 10-2018-7015724, Office Action, dated Jun. 14, 2019.

* cited by examiner

METHOD AND SYSTEM FOR DETERMINING ENGINE OPERATION PARAMETER VALUES DURING A GEAR SHIFT OPERATION

CROSS-REFERENCE TO RELATED APPLICATION(S)

This application is a National Stage Application (filed under 35 § U.S.C. 371) of PCT/SE2016/051145, filed Nov. 18, 2016 of the same title, which, in turn claims priority to Swedish Application No. 1551488-8 filed Nov. 18, 2015 of the same title; the contents of each of which are hereby incorporated by reference.

TECHNICAL FIELD

The invention relates to a method, system, computer program product and vehicle for determining engine operation parameter values during and/or after a gear shift operation prior to performing said gear shift operation.

BACKGROUND OF THE INVENTION

For automatic or semi-automatic transmissions the gear shift operation during engine operation is performed based on an assessed available engine torque. For certain vehicles, e.g. heavy vehicles such as trucks, the gear shift may according to a variant be effected through shifts of one or more steps, e.g. a one-step shift, a two-step shift, a three-step shift, etc. depending on the available engine torque.

The gear shift operation comprises an off-ramp phase in which the torque is reduced to substantially zero. Then there is a synchronization phase in which the gear shift is completed by disengaging the current gear and engaging the chosen gear. During the synchronization phase the engine is synchronized to the next target speed. After the synchronization phase the gearbox controller returns the torque control to the driver demanded torque. The driver demand torque is supplied to the engine, increasing the available torque up to a level where an exhaust gas smoke limiting function of the combustion engine limits the development of available engine torque up to a driver demand torque. During a gear shift operation engine operation parameter values including boost pressure are affected which in turn have influence on emissions, engine efficiency and driveability.

In order to assess the gear shift operation, tests are made with the specific vehicle in order to determine the available engine torque. This however does not provide an accurate assessment in that the engine torque may vary due to the boost pressure to such an extent that the chosen gear is not the most suitable gear.

There is thus a need for improving engine operation control in connection to a gear shift operation.

SUMMARY OF THE INVENTION

An object of the present invention is to provide a method for determining engine operation parameter values during and/or after a gear shift operation prior to performing said gear shift operation which facilitates improved engine operation control.

Another object of the present invention is to provide a system for determining engine operation parameter values during and/or after a gear shift operation prior to performing said gear shift operation which facilitates improved engine operation control.

These and other objects, apparent from the following description, are achieved by a method, a system, a vehicle, a computer program and a computer program product, as set out in the appended independent claims. Preferred embodiments of the method and the system are defined in appended dependent claims.

Specifically an object of the invention is achieved by a method for determining engine operation parameter values during and/or after a gear shift operation prior to performing said gear shift operation. The method comprises the steps of, prior to the gear shift operation: determining initial conditions comprising torque demand and engine speed and certain other engine operation parameter values; providing said initial conditions to an engine operation simulation model; providing a torque development course as well as an engine speed development course during the intended gear shift operation to said engine operation simulation model; and determining desired engine operation parameter values by means of said engine operation simulation model based upon the information thus provided to said engine operation simulation model.

This is applicable to any operation situation of a vehicle in connection to a gear shift operation, i.e. any gear shift operation for any kind of automatic or semi-automatic driveline/transmission configuration for any engine speed and any torque demand. By thus determining desired engine operation parameter values by means of said engine operation simulation model the need for calculations and storage in electronic storage media of such parameters is reduced. Thus, hereby the need for occupation of storage in storage media such as a server, electronic control unit or the like is reduced as well as the need for computer power for computing a large number of operation situations.

Hereby improved engine operation control is facilitated in that the engine operation parameter values thus determined by means of said engine operation simulation model prior to the gear shift may be used for improving the engine control for e.g. controlling emissions, improving efficiency and/or improving driveability.

According to an embodiment of the method said initial conditions determined for said certain other engine operation parameter values comprise any of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions. Hereby the modelling of the specific gear shift operation may be optimized.

According to an embodiment of the method said desired engine operation parameter values determined by means of said engine operation simulation model comprises any of: boost pressure, exhaust gas pressure, turbine speed, compressor speed and exhaust gas temperature. Hereby improved engine operation control is facilitated in that the engine operation parameter values thus determined by means of said engine operation simulation model prior to the gear shift may be used for improving the engine control. Thus modelled engine operation parameter values comprising any of: boost pressure, exhaust gas pressure, turbine speed, compressor speed and exhaust gas temperature may for example be used for engine operation control for controlling emissions by controlling the engine speed to a more suitable operation point from an emission point of view for the gear shift operation, or for controlling the exhaust treatment. Control of emissions may comprise control of NOx-emissions, control of emissions of particles, control of CO-emissions, control of HC-emissions, control of N2O-emssions and/or control of NH3-emissions. By thus controlling emissions based on the modelled engine operation parameter values comprising any of: boost pressure, exhaust gas pressure, turbine speed, compressor speed and exhaust gas temperature reduction of emissions is facilitated and thus easy adaption to legal requirements with regard to emissions is facilitated. Thus modelled engine operation parameter values comprising turbine speed may for example be used for engine operation control for predictive protection against too high turbine speeds or for improving efficiency of the turbocharger. Thus modelled engine operation parameter values comprising boost pressure may for example be used for engine operation control for improving drivability by providing a more accurate a basis for the gear shift operation by determining available engine torque based on the thus modelled boost pressure.

According to an embodiment of the method said torque development course and said engine speed development course during the intended gear shift operation are determined prior to said gear shift operation based on said initial conditions for torque demand and engine speed and initial conditions for certain other engine operation parameter values comprising current gear. Hereby an efficient way of determining torque development course and engine speed development course during the intended gear shift operation is obtained. According to an embodiment the torque development course and engine speed development course during the intended gear shift operation are determined by modelling initial conditions for torque demand and engine speed and initial conditions for certain other engine operation parameter values comprising current gear in a reference input model. Thus, the initial conditions for torque demand and engine speed and initial conditions for certain other engine operation parameter values comprising current gear are provided to the reference input model. The current gear, i.e. the current transmission ratio, prior to the gear shift operation is known and used as input to the reference input model, i.e. as input for determining the torque development course and engine speed course. Data for the driveline for the specific vehicle comprising which kind of transmission/gearbox, moment of inertia of the engine, rear axle ratio, wheel radius and certain calibrated strategies for the gear shift operation are according to an embodiment also known and used as input to the reference input model, i.e. as input for determining the torque development course and engine speed course.

According to an embodiment the method further comprises the step of controlling engine operation based upon one or more of said engine operation parameter values determined by means of said engine operation simulation model for controlling emissions and/or improving efficiency and/or improving drivability. Hereby improved engine operation is obtained.

According to an embodiment of the method an exhaust gas smoke limiting function of a combustion engine control system of a vehicle is considered by said engine operation simulation model, the step of controlling engine operation further comprising the step of determining an available engine torque corresponding to activation of limitation of engine torque provided by said exhaust gas smoke limiting function based on a determined boost pressure in connection to gear shift engagement. Hereby a more accurate a basis for the gear shift operation is provided such that the correct gear is chosen prior to the gear shift operation.

Specifically an object of the invention is achieved by a system for determining engine operation parameter values during and/or after a gear shift operation prior to performing said gear shift operation. The system comprises: means for determining initial conditions prior to the gear shift operation, said initial conditions comprising torque demand and engine speed and certain other engine operation parameter values; means for providing said initial conditions to an engine operation simulation model; means for providing a torque development course as well as an engine speed development course during the intended gear shift operation to said engine operation simulation model; and means for determining desired engine operation parameter values by means of said engine operation simulation model based upon the information thus provided to said engine operation simulation model.

According to an embodiment of the system said initial conditions determined for said certain other engine operation parameter values comprises any of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

According to an embodiment of the system said desired engine operation parameter values determined by means of said engine operation simulation model comprises any of: boost pressure, exhaust gas pressure, turbine speed, compressor speed and exhaust gas temperature.

According to an embodiment the system comprises means for determining said torque development course and said engine speed development course during the intended gear shift operation prior to said gear shift operation based on said initial conditions for torque demand and engine speed and initial conditions for certain other engine operation parameter values comprising current gear.

According to an embodiment the system further comprises means for controlling engine operation based upon one or more of said engine operation parameter values determined by means of said engine operation simulation model for controlling emissions and/or improving efficiency and/or improving drivability.

According to an embodiment of the system an exhaust gas smoke limiting function of a combustion engine control system of a vehicle is arranged to be considered by said engine operation simulation model, the means for controlling engine operation further comprising means for determining an available engine torque corresponding to activation of limitation of engine torque provided by said exhaust gas smoke limiting function based on a determined boost pressure in connection to gear shift engagement.

The system for determining engine operation parameter values during and/or after a gear shift operation prior to performing said gear shift operation is adapted to perform the method as set out herein.

The system according to the invention has the advantages according to the corresponding method.

Specifically an object of the invention is achieved by a vehicle comprising a system according to the invention as set out herein.

Specifically an object of the invention is achieved by a computer program for determining engine operation parameter values during and/or after a gear shift operation prior to performing said gear shift operation, said computer program comprising program code which, when run on an electronic control unit or another computer connected to the electronic control unit, causes the electronic control unit to perform the method according to the invention.

Specifically an object of the invention is achieved by a computer program product comprising a digital storage medium storing the computer program.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which:

FIG. 3b schematically illustrates an engine speed development course during a gear shift operation corresponding to the gear shift operation in FIG. 3a;

DETAILED DESCRIPTION OF THE INVENTION

Hereinafter the term "link" refers to a communication link which may be a physical connector, such as an optoelectronic communication wire, or a non-physical connector such as a wireless connection, for example a radio or microwave link.

Hereinafter the term "demanded torque", "demanding a torque", "demanded engine torque" or the like for a vehicle refers to a torque demanded by the driver of the vehicle, or by any suitable torque demanding function such as a cruise control torque demanding function, i.e. a torque demanding function provided by a cruise control system, or a speed limiter torque demanding function, i.e. a torque demanding function provided by a speed limiter system. The torque may thus be demanded by the driver of the vehicle or any other suitable torque demanding function.

Hereinafter the term "engine operation parameter" and "engine operation parameter values" refers to any parameter/parameter value relevant for engine operation in connection to a gear shift operation comprising any parameter/parameter value directly or indirectly affecting engine operation in connection to a gear shift operation. In connection to a gear shift operation comprises prior to the gear shift operation including immediately before the gear shift operation, during the gear shift operation and after the gear shift operation.

Hereinafter the term "means for" e.g. in relation to "means for determining initial conditions prior to the gear shift operation", "means for providing said initial conditions to an engine operation simulation model", "means for providing a torque development course as well as an engine speed development course during the intended gear shift operation to said engine operation simulation model", and "means for determining desired engine operation parameter values by means of said engine operation simulation model" refers to "means adapted for".

Figure 2:
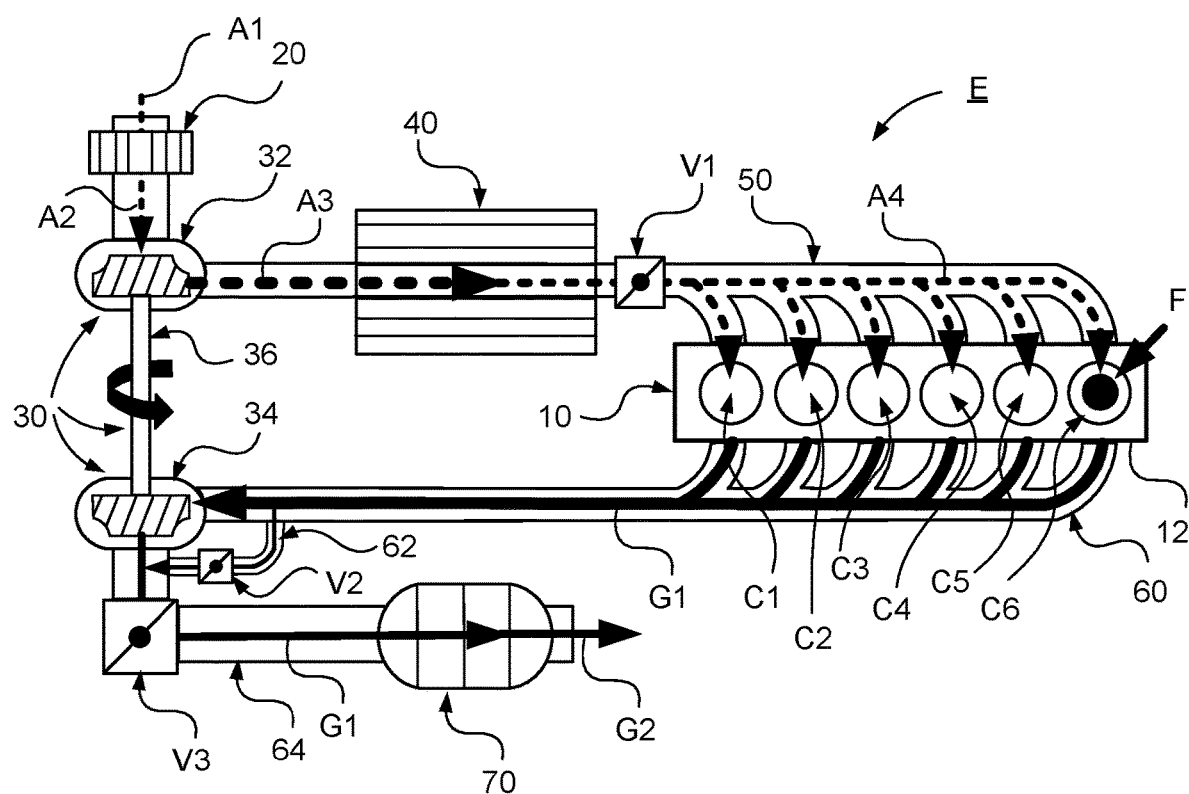
FIG. 2 schematically illustrates the gas flow through a turbocharged diesel engine.

The engine according to the present invention could be any suitable internal combustion engine with any suitable number of cylinders. The internal combustion engine according to the present invention could for example be a 5-cylinder engine, a 6-cylinder engine or an 8-cylinder engine. The cylinders could be in any suitable alignment, for example inline engine or a V-engine. In FIG. 2 an embodiment for a 6-cylinder engine is described. The internal combustion engine according to the present invention could be any supercharged internal combustion engine such as a turbocharged internal combustion engine.

The transmission for providing gear shift operations can be any suitable automatic or semi-automatic transmission configured to provide automatic or semi-automatic gear shift operations during drive of a vehicle.

Figure 1:
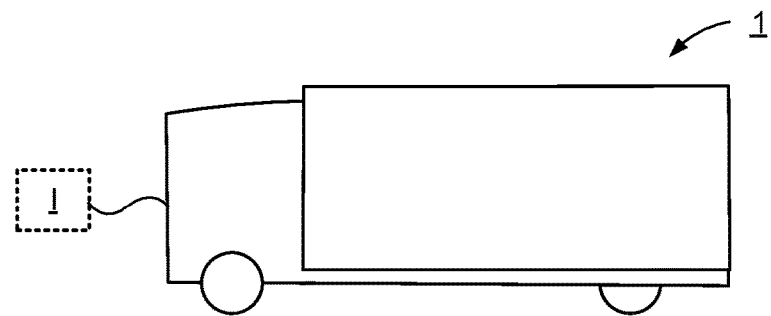
FIG. 1 schematically illustrates a side view of a vehicle according to the present invention.

FIG. 1 schematically illustrates a side view of a vehicle 1 according to the present invention. The exemplified vehicle 1 is a heavy vehicle in the shape of a truck. The vehicle according to the present invention could be any suitable vehicle such as a bus or a car. The vehicle is driven by means of an internal combustion engine being supercharged by means of a compressor configured to compress air into the cylinders of the engine. The vehicle is according to an embodiment driven by means of an internal combustion engine being turbocharged by means of a turbo compressor configured to compress air into the cylinders of the engine. The vehicle comprises an automatic or semi-automatic transmission configured to provide automatic or semi-automatic gear shift operation during drive of the vehicle. The vehicle comprises according to an embodiment a combustion engine control system having an exhaust gas limiting function for limiting exhaust gas smoke during combustion by limiting the allowable amount of fuel to the cylinders when applicable.

The vehicle 1 comprises a system I for determining engine operation parameter values during and/or after a gear shift operation prior to performing said gear shift operation.

FIG. 2 schematically illustrates the gas flow through a turbocharged diesel engine 10.

The components relevant for the gas flow during engine operation are denoted as the engine operation configuration E. The engine operation configuration E comprises the engine 10.

In this example an engine 10 with six cylinders C1, C2, C3, C4, C5, C6 is shown. The engine 10 comprises an engine block 12 for housing the cylinders and other engine operation components.

The engine 10 is arranged to provide a four stroke cycle. The complete four stroke cycle forms a single thermodynamic cycle from which mechanical work will be extracted for operating a vehicle.

The strokes comprise an intake stroke filling the respective cylinder C1-C6 with air, a compression stroke where the air is compressed and at the end of which fuel is injected for combustion, here illustrated with injection of fuel F into cylinder C6, an expansion stroke where the combustion is completed and an exhaust stroke.

The engine operation configuration E further comprises an air filter 20 through which ambient air A1 is arranged to pass so that filtered air A2 is obtained.

The engine operation configuration E comprises a turbocharger 30 having a compressor 32, a turbine 34 and a shaft 36 operably connecting the compressor 32 and turbine 36. The compressor 32 is arranged to compress the filtered air A2 so that compressed air A3 is obtained.

The engine operation configuration E comprises an intercooler 40 for cooling the compressed air A3 such that cooled compressed air A4 is obtained.

The engine operation configuration E comprises an intake manifold 50 for distributing the air, i.e. the compressed air A4 to the cylinders C1-C6.

The engine operation configuration E comprises a throttle valve V1 arranged to control the distribution of air A4 to the cylinders C1-C6.

The engine operation configuration E comprises an exhaust manifold 60 for distributing exhaust gas G1 from the cylinders C1-C6 to the turbine 34, the exhaust gas being arranged to pass the turbine 34 for operating the turbocharger 30 such that the compressor 32 compresses the filtered air A2.

The exhaust manifold 60 comprises a waste gate 62 for allowing exhaust gas to bypass the turbine 34 and further to the exhaust pipe 64. The engine operation configuration E comprises a valve V2 arranged to control the distribution of exhaust gas through the waste gate 62.

The engine operation configuration E comprises an exhaust gas brake V3 arranged downstream of the turbine and downstream of the waste gate. When activated, the exhaust gas brake V3 is configured to provide an exhaust back pressure by rendering exhaust gas flow through the exhaust pipe 64 more difficult. The exhaust back pressure is used for braking the engine speed. The exhaust back pressure thus created increases engine temperature due to the thus increased load. The exhaust back pressure may be used for increasing engine temperature and exhaust gas temperature, this being used at low engine speeds as the exhaust gases at low engine speeds do not reach high enough temperatures in order for the exhaust treatment to function efficiently. The exhaust gas brake V3 comprises a valve configuration for controlling the exhaust gas flow through the exhaust pipe 64.

The engine operation configuration E comprises an exhaust treatment system 70 arranged to treat the exhaust gas in order to reduce emissions so that treated exhaust gases G2 exits the exhaust gas pipe 64.

FIG. 2 thus illustrates the gas flow through the turbocharged diesel engine and hence the gas flow through the engine operation configuration E. Ambient air A1 enters through the air filter 20, is compressed in the compressor 32 and led through the intercooler 40 to the intake manifold 50 before entering the cylinders 1-6. Fuel F is added by injection into the cylinders and after combustion, the exhaust gas G1 pass through the turbine 34 to the exhaust treatment system 70.

Figure 4:
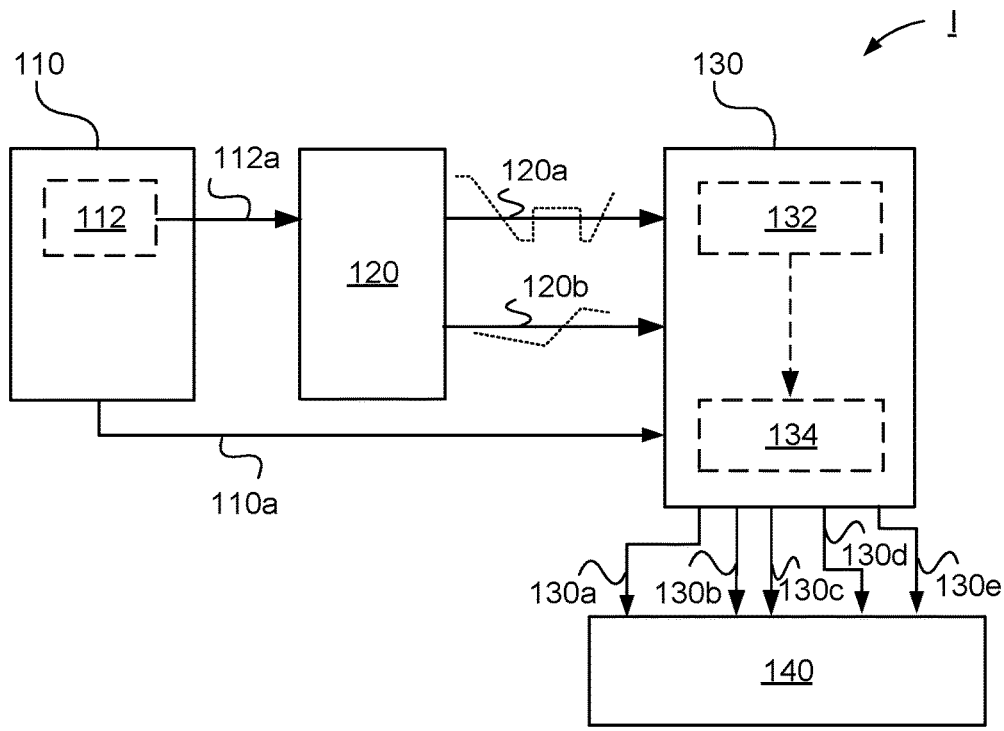
FIG. 4 schematically illustrates a system for determining engine operation parameter values during and after a gear shift operation prior to performing the gear shift operation according to an embodiment of the present invention.
Figure 5:
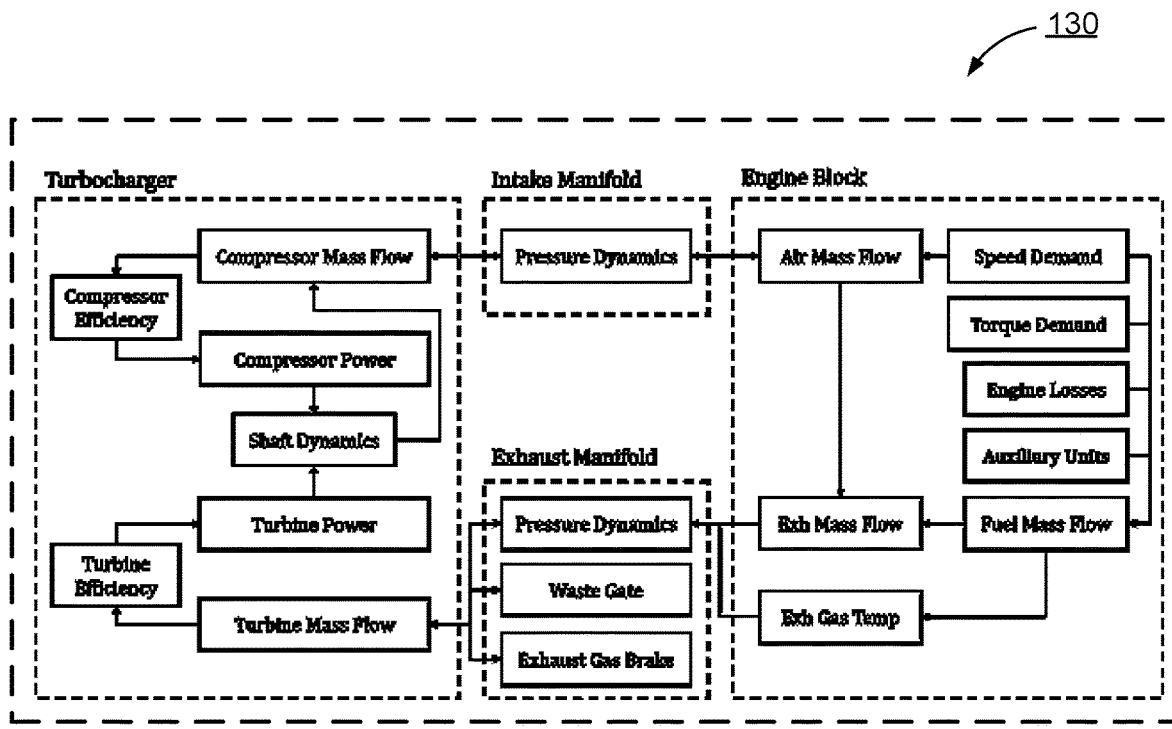
FIG. 5 schematically illustrates an engine operation simulation model for determining engine operation parameter values according to an embodiment of the present invention.

All components of the engine operation configuration E apart from the compressor 32 will give rise to certain pressure drops due to frictions in the air flow based on the flow rate and obstructive geometry. Components modelled after this attribute in the engine operation simulation model described with reference to FIG. 4 and FIG. 5 are modelled as restrictions and determine the passing mass flow. This includes the engine block 12 that creates the pumping work in the gas path as well as the compressor 32 and turbine 34. The pipes and manifolds 50, 60 that separate the restrictions are subject to pressure and temperature changes due to in and out mass flows and heat exchange to the environment and are according to an embodiment modelled as control volumes in the engine operation simulation model described with reference to FIG. 4 and FIG. 5.

In FIG. 2 the gas flow through a turbocharged diesel engine 10 is shown, where the engine operation configuration E comprises a turbocharger 30 with a compressor 32 and turbine 34, where exhaust gas is arranged to pass the turbine 34 for operating the turbocharger 30 such that the compressor 32 compresses the filtered air A2, the compressor 32 thus being driven by the turbine 34. The invention is equally applicable to any supercharged engine where the compressor is driven/operated for compressing air in any suitable manner. The compressor could e.g. be operated by the engine via a belt or the like.

Figure 3A:
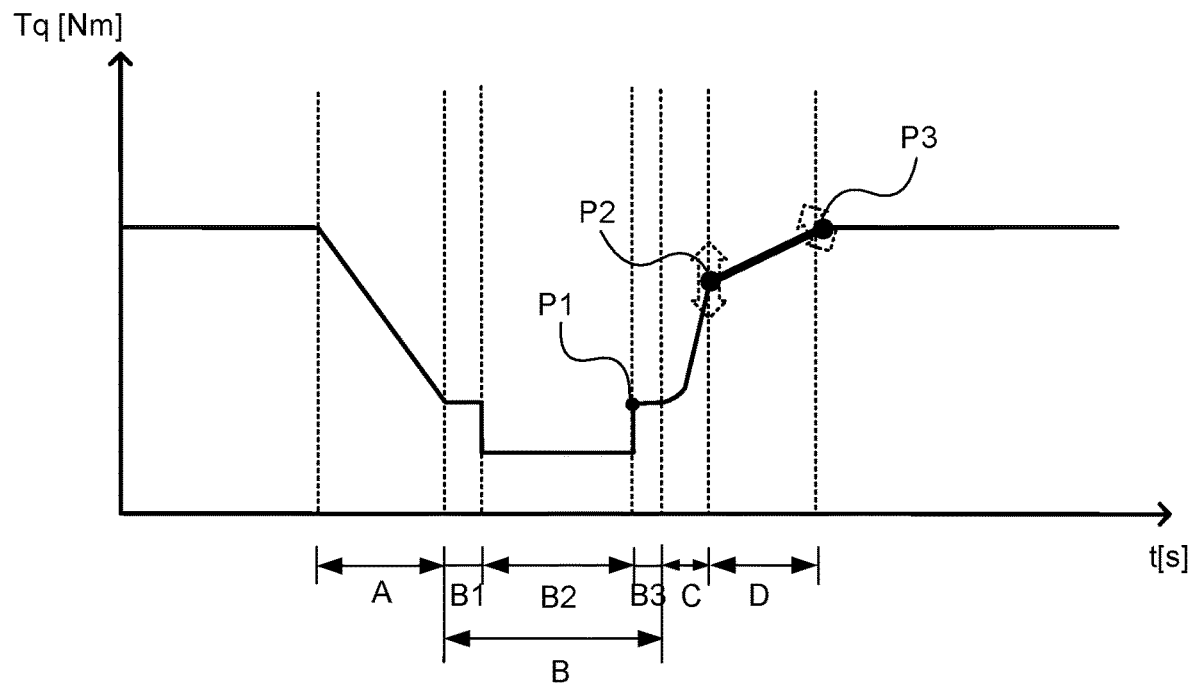
FIG. 3a schematically illustrates a torque development course during a gear shift operation.
Figure 3B:
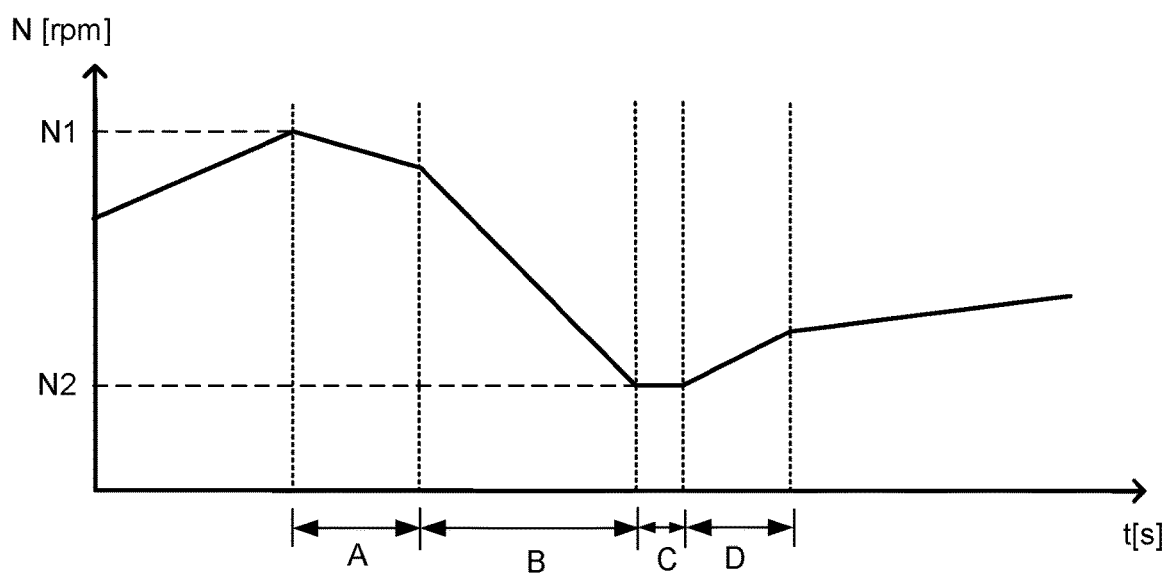

FIG. 3a schematically illustrates a torque development course during a gear shift operation and FIG. 3b schematically illustrates an engine speed development course during a gear shift operation. The gear shift operation in FIG. 3a is an up-shift operation, i.e. shift from a lower gear to a higher gear. In an up-shift operation there is a decrease in engine rotational speed as illustrated in FIG. 3b. The up-shift operation is an example. The invention is equally applicable to a down-shift operation. The invention is further applicable to any engine speed.

The gear shift operation comprises an off-ramp phase A in which the Torque Tq is reduced to substantially zero as seen in FIG. 3a.

As the engine speed has reached its gear shift speed N1 the off-ramp phase A starts and then engine speed decreases.

Then there is a gear disengagement, synchronization and gear engagement phase B in which the gear shift is completed. The synchronization phase B comprises a disengagement phase B1 in which a gear shift disengagement of the current gear is effected. The phase B comprises a synchronization phase B2 in which no gear is connected. The phase B comprises an engagement phase B3 in which a gear shift engagement to the changed gear is effected. The gear shift engagement is initiated in point P1.

During the synchronization phase B the engine speed is decreased down to the target speed N2.

After the phase B including the synchronization phase B2 and the change of actual gear in the gear disengagement phase B1 to target gear in the gear engagement phase B3, an on-ramp phase C is initiated, in which fuel corresponding to the demanded torque to the engine is supplied, increasing the available torque up to a level in the point P2 where an exhaust gas smoke limiting function of the combustion engine is arranged to limit the development of available engine torque.

The gear shift operation according to the example in FIG. 3a thus comprises a smoke limiting development phase D of the available torque up to an engine torque corresponding to a demanded torque reached in the point P3.

During the smoke limiting development phase D the engine speed is increasing up to an engine speed being lower than the gear shift speed N1, this being an up-shift operation.

As described with reference to FIG. 4-8 the invention relates to determining engine operation parameter values during and after a gear shift operation prior to performing said gear shift operation. The engine operation parameter values determined comprises boost pressure. The engine operation parameter values determined may also comprise exhaust gas pressure, turbine speed and exhaust gas temperature.

As described in more detail e.g. in FIG. 4 initial conditions comprising torque demand and engine speed and certain other engine operation parameter values are determined prior to the gear shift operation. Said initial conditions determined for said certain other engine operation parameter values comprises any of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

A torque development course and an engine speed development course during the intended gear shift operation are determined prior to said gear shift operation based on initial conditions for torque demand and engine speed and initial conditions for driveline information comprising current gear. The torque development course and an engine speed development course during the intended gear shift operation are determined prior to said gear shift operation are according to an embodiment as explained in FIG. 4 modelled based on said initial conditions. Such determined torque development course and an engine speed development course during the intended gear shift operation may correspond to the torque development course and an engine speed development course in FIGS. 3a and 3b, i.e. for such a gear shift operation.

The initial conditions and the torque development course and an engine speed development course during the intended gear shift operation are provided to an engine operation simulation model. Desired engine operation parameter values are then determined by means of the engine operation simulation model based upon the information thus provided to said engine operation simulation model. This is described in more detail in FIG. 4.

The desired engine operation parameter values determined by means of said engine operation simulation model comprises any of: boost pressure, exhaust gas pressure, turbine speed, compressor speed and exhaust gas temperature.

In order to determine the available torque up to a level in the point P2 where an exhaust gas smoke limiting function of the combustion engine is arranged to limit the development of available engine torque prior to the gear shift operation the engine boost pressure is determined prior to the gear shift operation by means of said engine operation simulation model.

The available engine torque at point P2 is determined based on the thus determined boost pressure in connection to gear shift engagement.

The determined development of available engine torque is taken as a basis for the gear shift operation.

Below in connection to e.g. FIG. 4-7 other applications for the thus obtained engine operation parameter values are described.

FIG. 4 schematically illustrates a system I for determining engine operation parameter values during and after a gear shift operation prior to performing the gear shift operation according to an embodiment of the present invention.

The system comprises means 110 for determining initial conditions prior to the gear shift operation. The initial conditions comprise engine operation parameter values. Engine operation parameter values may comprise any engine operation parameter value affecting the engine operation prior to, during and/or after the gear shift operation. The means 110 for determining initial conditions prior to the gear shift operation comprises means for measuring engine operation parameters. The means for measuring engine operation parameters may comprise any suitable sensor unit comprising any suitable pressure sensor unit, any suitable temperature sensor unit, any suitable speed sensor unit or the like. The means 110 for determining initial conditions prior to the gear shift operation comprises means for calculating engine operation parameters. The means 110 for determining initial conditions prior to the gear shift operation comprises the engine management system and the gearbox/transmission management system.

The initial conditions comprise the torque demand prior to the gear shift operation. The torque demand is the torque demanded prior to the gear shift operation. The means 110 for determining initial conditions is arranged to determine the torque demand prior to the gear shift operation. The torque demand is arranged to be determined by the means for calculating engine operation parameters.

The initial conditions comprise engine speed prior to the gear shift operation. The means 110 for determining initial conditions is arranged to determine the engine speed prior to the gear shift operation. The engine speed is arranged to be determined by the means for measuring engine operation parameters.

The initial conditions comprise certain other engine operation parameter values. The certain other engine operation parameter values comprises any of: driveline information comprising current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

The means 110 for determining initial conditions is arranged to determine driveline information. Driveline information comprises current gear prior to the gear shift. Driveline information comprises data for the driveline for the specific vehicle comprising type of transmission/gearbox, moment of inertia of the engine, rear axle ratio, wheel radius and certain calibrated strategies for the gear shift operation. The driveline information is arranged to be determined by the engine management system.

The means 110 for determining initial conditions is arranged to determine ambient temperature. The ambient temperature is arranged to be determined by the means for measuring and/or means for calculating engine operation parameters.

The means 110 for determining initial conditions is arranged to determine the boost pressure prior to the gear shift operation. The boost pressure is arranged to be determined by the means for measuring and/or means for calculating engine operation parameters.

The means 110 for determining initial conditions is arranged to determine the boost temperature prior to the gear shift operation. The boost temperature is arranged to be determined by the means for measuring and/or means for calculating engine operation parameters.

The means 110 for determining initial conditions is arranged to determine the air mass flow prior to the gear shift operation. The air mass flow is arranged to be determined by the means for measuring and/or means for calculating engine operation parameters.

The means 110 for determining initial conditions is arranged to determine the exhaust gas pressure prior to the gear shift operation. The exhaust gas pressure is arranged to be determined by the means for measuring engine operation parameters.

The means 110 for determining initial conditions is arranged to determine the exhaust gas temperature prior to the gear shift operation. The exhaust gas temperature is arranged to be determined by the means for measuring and/or means for calculating engine operation parameters.

The means 110 for determining initial conditions is arranged to determine the exhaust gas mass flow prior to the gear shift operation. The exhaust gas mass flow is arranged to be determined by the means for measuring and/or means for calculating engine operation parameters.

The means 110 for determining initial conditions is arranged to determine the turbine speed prior to the gear shift operation. The turbine speed is arranged to be determined by the means for measuring and/or means for calculating engine operation parameters.

The means 110 for determining initial conditions is arranged to determine the compressor speed prior to the gear shift operation. The compressor speed is arranged to be determined by the means for measuring and/or means for calculating engine operation parameters.

The means 110 for determining initial conditions is arranged to determine the engine temperature prior to the gear shift operation. The engine temperature is arranged to be determined by the means for measuring and/or means for calculating engine operation parameters.

The means 110 for determining initial conditions is arranged to determine the engine operation losses prior to the gear shift operation. The engine operation losses is arranged to be determined by the means for measuring and/or means for calculating engine operation parameters.

The means 110 for determining initial conditions is arranged to determine the actuator positions prior to the gear shift operation. The actuator positions is arranged to be determined by the means for measuring and/or means for calculating engine operation parameters. Such actuator positions comprise according to an embodiment the waste gate position, i.e. whether the waste gate/valve of the waste gate is open for allowing fuel to bypass the turbine or closed. Such actuator positions comprise according to an embodiment a dump valve, where the engine is an Otto engine. Such actuator positions may further comprise position of the exhaust gas brake. Such actuator positions may further comprise position of the throttle valve for controlling distribution of air to cylinders of the engine. Such actuator positions may further comprise position of injectors/injector valves for controlling injection of fuel to cylinders of the engine. Such actuator positions may further comprise position of the supercharger/turbocharger actuator, e.g. a variable geometry turbocharger actuator. Such actuator positions may further comprise position of the variable inlet valve for controlling air intake. Such actuator positions may further comprise position of the variable outlet valve for controlling outlet of exhaust gas. Such actuator positions may further comprise position of the hybrid drive arrangement for controlling contribution of electric drive, where hybrid drive arrangement may comprise one or more electric machines having actuators for said control.

The system I comprises means 120 for determining a torque development course and an engine speed development course during the intended gear shift operation prior to said gear shift operation based on said initial conditions for torque demand and engine speed and initial conditions for driveline information comprising current gear.

According to an embodiment the torque development course and engine speed development course during the intended gear shift operation are determined by modelling based upon initial conditions for torque demand and engine speed and driveline information comprising current gear prior to the gear shift operation. Thus, the torque development course and engine speed development course during the intended gear shift operation are modelled using said initial conditions. The means 120 for determining a torque development course and an engine speed development course during the intended gear shift operation thus comprises or is constituted by a reference input model for said modelling. Thus, according to an embodiment the means 120 represents the reference input model which is therefore being denoted as reference input model 120 below.

The system I comprises means 112 for providing initial conditions for torque demand and engine speed and driveline information to the means 120 for determining a torque development course and an engine speed development course during the intended gear shift operation prior to said gear shift operation. Driveline information comprises current gear prior to the gear shift operation. The means 112 is comprised in the means 110.

The means 112 for providing initial conditions for torque demand and engine speed and driveline information is operably connected to the means 120 for determining a torque development course and an engine speed development course via a link 112a. The means 120 is via the link 112a arranged to receive signals representing data for initial conditions for torque demand. The means 120 is via the link 112a arranged to receive signals representing data for initial conditions for engine speed. The means 120 is via the link 112a arranged to receive signals representing data for initial conditions for driveline information comprising current gear. The link 112a may be comprised by one or more links. The link 112a may be comprised by separate links for one or more of the initial conditions determined by the means 110.

The initial conditions for torque demand and engine speed and driveline information are used as input to the reference input model 20, i.e. as input for determining the torque development course and engine speed course by thus modelling the torque development course and engine speed course.

By modelling the torque development course and engine speed course the speed during down ramping is assumed to stay constant. The target speed, i.e. corresponding to N2 in FIG. 3b, is assumed to be known for a certain gear-shift operation.

The speed during down ramping is assumed to stay constant N1. The target speed, i.e. corresponding to N2 in FIG. 3b, is assumed to be known for a certain gear-shift operation. The synchronization time B2 as well as decoupling time B1 and coupling time B3 are assumed to be known and are set as tuning parameters. This yields the engine speed profile of the ramp. The engine speed after reaching the target speed can be assumed constant. For evaluation, a certain number of engine speed reference profiles, e.g. five engine speed reference profiles, are plotted against the real speed with the same initial conditions as the simulations are intended to run.

Starting at the initial conditions the engine torque needs to be ramped down to zero. The ramp derivative is calibrated for individual vehicle configurations and adapted to situational parameters. In the reference input model 120 this calibrated data is used together with driveline information comprising situational factors such as pedal position and current gear. During the synchronization phase, a certain engine torque will be demanded in order to ramp the engine to the target speed, either positive torque or brake torque translated into exhaust gas brake actuation for down-shifts and up-shifts respectively. This depends on how fast the gear-shift needs to be performed. The synchronization torque is determined by calculation given the engine speed profile.

Up-shifts require that no fuel is injected during synchronization and ideally that the exhaust gas brake is activated at a level corresponding to the negative torque demand. Ultimately, this means that the same approach as used for the down-shifts could be viable for up-shifts as well.

The system I comprises an engine operation simulation model 130.

The means 110 is arranged to provide the determined initial conditions to the engine operation simulation model 130. The means 110 is operably connected to the engine operation simulation model 130 via a link 110*a*. The engine operation simulation model 130 is via the link 110*a* arranged to receive signals representing data for initial conditions thus determined by the means 110.

The engine operation simulation model 130 is via the link 110*a* arranged to receive signals representing data for initial conditions for torque demand. The engine operation simulation model 130 is via the link 110*a* arranged to receive signals representing data for initial conditions for engine speed. The engine operation simulation model 130 is via the link 110*a* arranged to receive signals representing data for initial conditions for certain other engine operation parameter values comprising any of: driveline information comprising current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

The link 110*a* may be comprised by one or more links. The link 110*a* may be comprised by separate links for one or more of the initial conditions determined by the means 110.

The means 120 is arranged to provide the torque development course as well as the engine speed development course during the intended gear shift operation to said engine operation simulation model 130.

The means 120 is operably connected to the engine operation simulation model 130 via a link 120*a*. The engine operation simulation model 130 is via the link 120*a* arranged to receive signals representing data for the torque development course during the intended gear shift operation.

The means 120 is operably connected to the engine operation simulation model 130 via a link 120*b*. The engine operation simulation model 130 is via the link 120*b* arranged to receive signals representing data for the engine speed development course during the intended gear shift operation.

The engine operation simulation model 130 is arranged to determine desired engine operation parameter values based upon the information thus provided to said engine operation simulation model from the means 110 and means 120.

The engine operation simulation model 130 is arranged to determine desired engine operation parameter values based upon the initial conditions provided by the means 110, and the torque development course as well as the engine speed development course during the intended gear shift operation provided by the means 120.

The system I thus comprises means for determining desired engine operation parameter values by means of said engine operation simulation model 130 based upon the information thus provided to the engine operation simulation model 130.

According to an embodiment of the system said desired engine operation parameter values determined by means of said engine operation simulation model 130 comprises any of: boost pressure, exhaust gas pressure, turbine speed, compressor speed and exhaust gas temperature.

The engine operation simulation model 130 comprises a static fuelling model 132 for modelling static behavior based on torque and engine speed, which renders losses in a certain point of time and the demanded torque, the demanded torque and losses giving the total torque which provides the total amount of fuel needed, which gives the exhaust gas temperature. The engine operation simulation model 130 further comprises a dynamic gas path model 134 for modelling the dynamic gas path during a gear shift operation based on the fuel temperature obtained from the static fuelling model 132. The dynamic gas path model 134 is operably connected to the static fuelling model 132 via a link. The dynamic gas path model 134 is via the link arranged to receive information comprising exhaust gas temperature from the static fuelling model 132.

According to an embodiment the system I further comprises means 140 for controlling engine operation based upon one or more of said engine operation parameter values determined by means of said engine operation simulation model for controlling emissions and/or improving efficiency and/or improving drivability.

The means 140 is according to an embodiment comprised in electronic control unit. The means 140 is according to an embodiment constituted by an electronic control unit. The means 140 is according to an embodiment comprised in the engine electronic control unit. The means 140 comprises according to an embodiment an electronic control unit.

The means 140 for controlling engine operation is operably connected to the engine operation simulation model 130 via links 130*a*, 130*b*, 130*c*, 130*d*, 130*e*.

The means 140 for controlling engine operation is operably connected to the engine operation simulation model 130 via a link 130*a*. The means 140 for controlling engine operation is via the link 130*a* arranged to receive a signal representing data for boost pressure during and after the gear shift operation.

The means 140 for controlling engine operation is operably connected to the engine operation simulation model 130 via a link 130*b*. The means 140 for controlling engine operation is via the link 130*b* arranged to receive a signal representing data for exhaust gas pressure during and after the gear shift operation.

The means 140 for controlling engine operation is operably connected to the engine operation simulation model 130 via a link 130*c*. The means 140 for controlling engine operation is via the link 130*c* arranged to receive a signal representing data for turbine speed during and after the gear shift operation.

The means 140 for controlling engine operation is operably connected to the engine operation simulation model 130 via a link 130*d*. The means 140 for controlling engine operation is via the link 130*d* arranged to receive a signal representing data for compressor speed during and after the gear shift operation.

The means 140 for controlling engine operation is operably connected to the engine operation simulation model 130 via a link 130*e*. The means 140 for controlling engine operation is via the link 130*e* arranged to receive a signal representing data for exhaust gas temperature during and after the gear shift operation.

The means 140 for controlling engine operation is arranged to process data received from any of the links 130*a*, 130*b*, 130*c*, 130*d*, 130*e* for controlling engine operation during and/or after the gear shift operation based on one or more of the thus processed engine operation parameter values.

Hereby improved engine operation control is facilitated in that the engine operation parameter values thus determined by means of said engine operation simulation model prior to the gear shift are used for improving the engine control.

Thus, the means 140 for controlling engine operation may, based upon the modelled engine operation parameter values comprising any of: boost pressure, exhaust gas pressure, turbine speed, compressor speed and exhaust gas temperature, control the engine operation for controlling emissions by controlling the engine speed to a more suitable operation point from an emission point of view for the gear shift operation, or by controlling the exhaust treatment. Control of emissions may comprise control of NOx-emissions, control of emissions of particles, control of CO-emissions, control of HC-emissions, control of N2O-emssions and/or control of NH3-emissions. By thus controlling emissions based on the modelled engine operation parameter values comprising any of: boost pressure, exhaust gas pressure, turbine speed, compressor speed and exhaust gas temperature reduction of emissions is facilitated and thus easy adaption to legal requirements with regard to emissions is facilitated.

The means 140 for controlling engine operation may, based upon thus modelled engine operation parameter values comprising turbine speed, control engine operation for predictive protection against too high turbine speed or minimizing turbo lag or for improving efficiency of the turbocharger.

The means 140 for controlling engine operation may, based upon thus modelled engine operation parameter values comprising boost pressure, control engine operation for improving drivability by providing a more accurate a basis for the gear shift operation by determining available engine torque based on the thus modelled boost pressure.

The engine operation simulation model 130 is arranged to consider an exhaust gas smoke limiting function of a combustion engine control system of a vehicle.

The means 140 for controlling engine operation further comprises means for determining an available engine torque corresponding to activation of limitation of engine torque provided by said exhaust gas smoke limiting function based on the determined boost pressure in connection to gear shift engagement. Determination of available engine torque corresponding to activation of limitation of engine torque provided by said exhaust gas smoke limiting function based on the determined boost pressure in connection to gear shift engagement is described in connection to FIG. 2a illustrating an example of a gear shift operation and such limitation.

The approach is to model the engine so that the boost pressure during a gear-shift can be simulated and extracted at the desired point in time. For this a physical mean value modelling is a suitable initial approach as a large part of the engine operation can be explained with known relations that uses averaged values over several engine cycles and neglects in-cycle variations. Such models are known and therefore not described in detail. Furthermore, the engine control system usually contains functions and mapped data for calculating physical relations and can be used in order to reduce calculation complexity, simplify models and make the model easier to apply to a wider selection of engine configurations.

As explained above the system I for determining engine operation parameter values during and/or after a gear shift operation prior to performing said gear shift operation comprises two models 120, 130, the input reference model 120 configured to simulate the gear-shift reference conditions, and the engine operation simulation model 130 which receives the gear-shift reference conditions as inputs and simulates the engine operation during the gear-shift operation and outputs the boost pressure, exhaust gas pressure, turbine speed, compressor speed and exhaust gas temperature.

As gear-shifts are controlled by predefined sets of calibrated instructions for each gear-shift type, these are used to model the reference inputs to the engine operation simulation model 130. The parameters representing the initial conditions are determined by current driving conditions that can be obtained from sensor units or the engine management system as mentioned earlier. These are also provided to the engine operation simulation model 130 and used there as initial conditions.

By determining the boost pressure by means of the engine operation simulation model 130 based on the torque development course and said engine speed development course during the intended gear shift operation and the initial conditions prior to the gear shift operation an available engine torque corresponding to activation of limitation of engine torque provided by said exhaust gas smoke limiting function based on a determined boost pressure. As the decision of which gear to shift to, i.e. how many steps to shift, in such a situation is to be based on the outcome of the engine operation simulation model 130 reference profiles of five target speeds are modelled. From the results obtained it is then possible to interpolate a final boost pressure for any target speed, on which the gear-shift decision can be based.

FIG. 5 schematically illustrates an engine operation simulation model 130 for determining engine operation parameter values according to an embodiment of the present invention.

The engine operation simulation model 130 is in FIG. 5 subdivided into four parts for illustrative purposes, a turbocharger part, an intake manifold part, an exhaust manifold part and an engine block part.

The engine operation simulation model 130 comprises a set of sub models of control volumes and restrictions. The dynamic sub models receive their necessary initial conditions when starting the simulation.

The sub models of the turbocharger part, intake manifold part, exhaust manifold part and engine block part are illustrated as boxes, the arrows connecting them indicating the main dependencies.

The modelling of the sub models will not be described in any detail as such modelling of engine operation is known.

The principle of the simulation itself is based on a filling and emptying cycle that sequentially steps through the dynamics of the engine gas path, e.g. simulating the gas path of the engine operation configuration E in FIG. 2 or for any other suitable internal combustion engine.

By starting at the given initial conditions for the intake manifold and using it for calculating the engine airflow, the second intake manifold state is found. From that, the combustion can be calculated in terms of exhaust temperature and mass flow into the exhaust manifold. Further applying the same approach for the following control volumes and restrictions the cycle is completed and can be repeated for as long as reference signals are available.

The engine operation simulation model 130 is configured to model the gas flow through an internal combustion engine, e.g. a turbocharged diesel engine and thus an engine operation configuration in accordance with FIG. 2.

Figure 6:
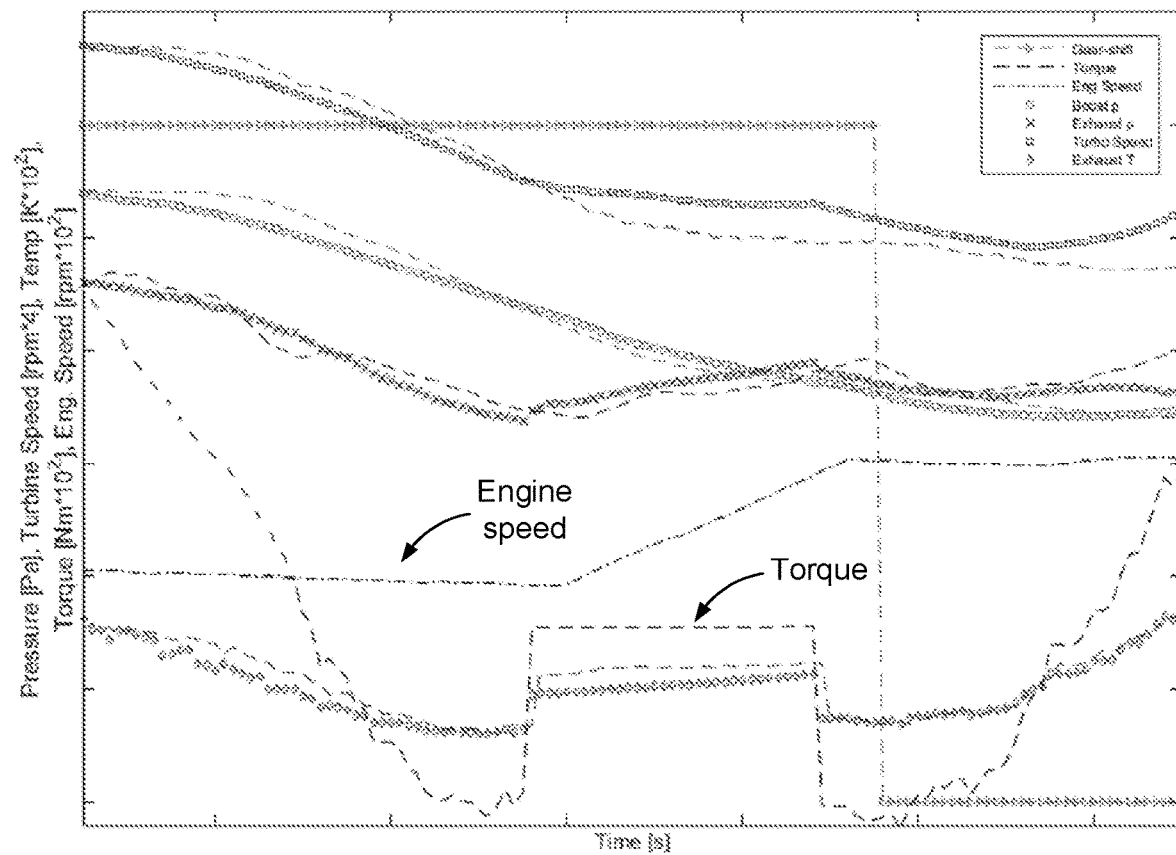
FIG. 6 schematically illustrates measured engine operation parameter values during a gear shift operation compared to corresponding simulated values determined according to the present invention.

FIG. 6 schematically illustrates measured engine operation parameter values during a gear shift operation compared to corresponding simulated values determined according to the present invention.

The simulated engine operation parameter values are simulated and hence determined by a system I according to FIG. 4. The engine operation parameter values has been obtained from the engine operation simulation model 130 described in FIG. 4 and FIG. 5.

The gear shift duration is illustrated by the dashed line with triangles in FIG. 6.

The torque development course and the engine speed development course during the intended gear shift operation have been determined with the input reference model 120 described in FIG. 4. The engine speed development course during the intended gear shift operation have been provided to engine operation simulation model as a basis for the modelling, and are presented in FIG. 6, engine speed with a dotted line and the torque with a dashed line.

The engine operation parameter values obtained from the engine operation simulation model 130, i.e. boost pressure, exhaust gas pressure, turbine speed, compressor speed and exhaust gas temperature, are compared with measured values for such a gear shift operation in order to validate the system. The measured values are dashed lines in connection to the corresponding modelled values. As can be seen the model gives a good result.

In FIG. 6 the pressure and turbo dynamics can be analysed together with values from the engine operation simulation model and reference signals, i.e. torque development course and the engine speed development course and gear shift duration. From this plot it is possible to draw conclusions on the actual performance of the engine operation simulation model and if necessary tune it appropriately.

Figure 7:
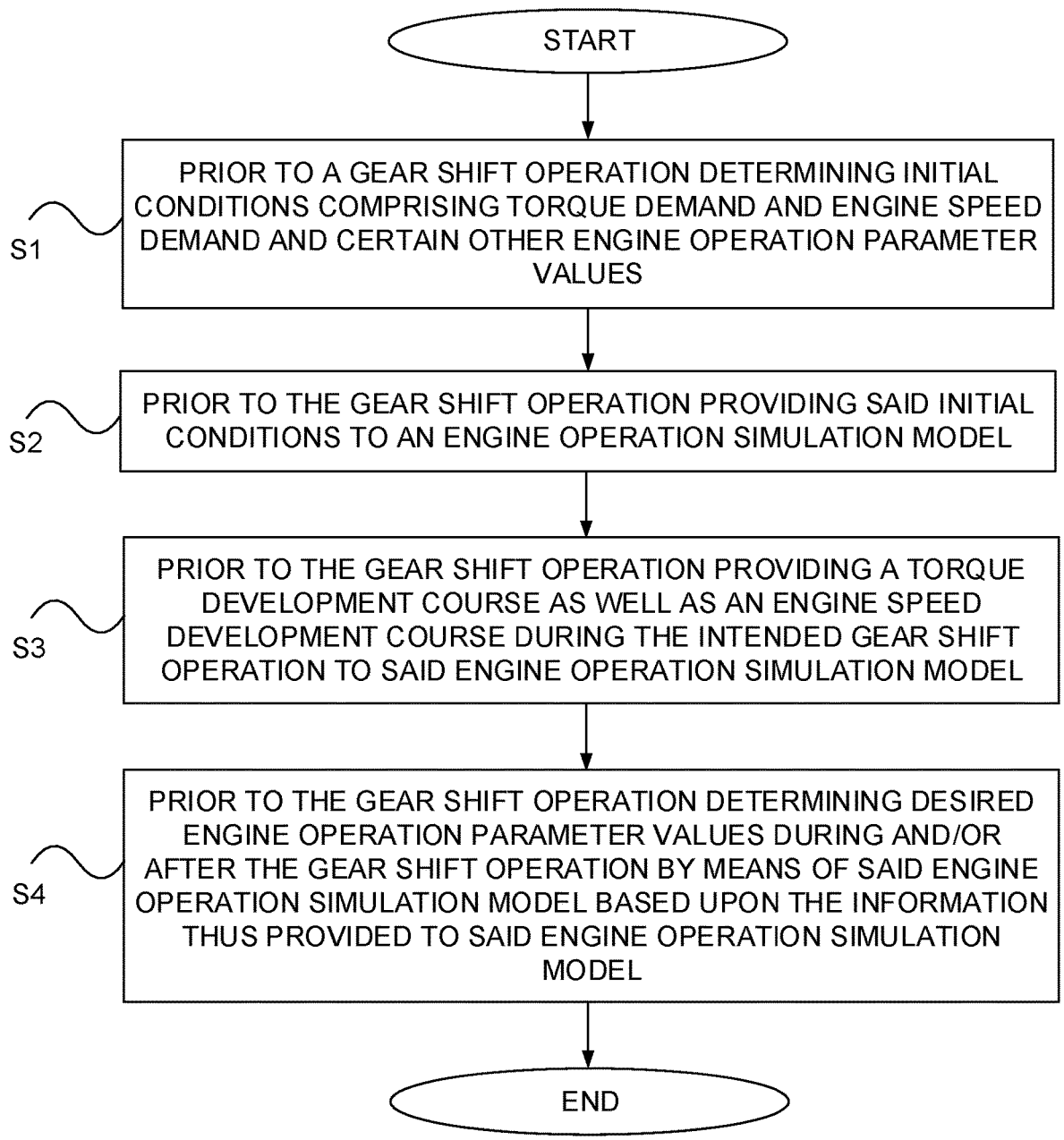
FIG. 7 schematically illustrates a block diagram of a method for determining engine operation parameter values during and after a gear shift operation prior to performing the gear shift operation according to an embodiment of the present invention.

FIG. 7 schematically illustrates a block diagram of a method for determining engine operation parameter values during and after a gear shift operation prior to performing the gear shift operation according to an embodiment of the present invention.

According to the embodiment the method for determining engine operation parameter values during and/or after a gear shift operation prior to performing said gear shift operation comprises a step S1. In this step the initial conditions comprising torque demand and engine speed and certain other engine operation parameter values are determined prior to the gear shift operation.

According to the embodiment the method for determining engine operation parameter values during and/or after a gear shift operation prior to performing said gear shift operation comprises a step S2. In this step the initial conditions are provided to an engine operation simulation model prior to the gear shift operation.

According to the embodiment the method for determining engine operation parameter values during and/or after a gear shift operation prior to performing said gear shift operation comprises a step S3. In this step a torque development course as well as an engine speed development course during the intended gear shift operation are provided to said engine operation simulation model prior to the gear shift operation.

According to the embodiment the method for determining engine operation parameter values during and/or after a gear shift operation prior to performing said gear shift operation comprises a step S4. In this step desired engine operation parameter values are determined by means of said engine operation simulation model based upon the information thus provided to said engine operation simulation model.

This is applicable to any operation situation of a vehicle in connection to a gear shift operation, i.e. any gear shift operation for any kind of automatic or semi-automatic driveline/transmission configuration for any engine speed. By thus determining desired engine operation parameter values by means of said engine operation simulation model the need for calculations and storage in electronic storage media of such parameters is reduced. Thus, hereby the need for occupation of storage in storage media such as a server, electronic control unit or the like is reduced as well as the need for calibration/need for computing a large number of operation situations.

Hereby improved engine operation control is facilitated in that the engine operation parameter values thus determined by means of said engine operation simulation model prior to the gear shift may be used for improving the engine control for e.g. controlling emissions, improving efficiency and/or improving driveability.

According to an embodiment of the method said initial conditions determined for said certain other engine operation parameter values comprises any of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions. Hereby the modelling of the specific gear shift operation may be optimized.

According to an embodiment of the method said desired engine operation parameter values determined by means of said engine operation simulation model comprises any of: boost pressure, exhaust gas pressure, turbine speed, compressor speed and exhaust gas temperature. Hereby improved engine operation control is facilitated in that the engine operation parameter values thus determined by means of said engine operation simulation model prior to the gear shift may be used for improving the engine control. Thus modelled engine operation parameter values comprising any of: boost pressure, exhaust gas pressure, turbine speed, compressor speed and exhaust gas temperature may for example be used for engine operation control for controlling emissions by controlling the engine speed to a more suitable operation point from an emission point of view for the gear shift operation, or for controlling the exhaust treatment. Control of emissions may comprise control of NOx-emissions, control of emissions of particles, control of CO-emissions, control of HC-emissions, control of N2O-emssions and/or control of NH3-emissions. By thus controlling emissions based on the modelled engine operation parameter values comprising any of: boost pressure, exhaust gas pressure, turbine speed, compressor speed and exhaust gas temperature reduction of emissions is facilitated and thus easy adaption to legal requirements with regard to emissions is facilitated. Thus modelled engine operation parameter values comprising turbine speed may for example be used for engine operation control for predictive protection against too high turbine speed or minimizing turbo lag or improving efficiency of the turbocharger. Thus modelled engine operation parameter values comprising boost pressure may for example be used for engine operation control for improving drivability by providing a more accurate a basis for the gear shift operation by determining available engine torque based on the thus modelled boost pressure.

According to an embodiment of the method said torque development course and said engine speed development course during the intended gear shift operation are determined prior to said gear shift operation based on said initial conditions for torque demand and engine speed and initial conditions for certain other engine operation parameter values comprising current gear. Hereby an efficient way of determining torque development course and engine speed development course during the intended gear shift operation is obtained. According to an embodiment the torque development course and engine speed development course during the intended gear shift operation are determined by modelling initial conditions for torque demand and engine speed and initial conditions for certain other engine operation parameter values comprising current gear in a reference input model. Thus, the initial conditions for torque demand and engine speed and initial conditions for certain other engine operation parameter values comprising current gear are provided to the reference input model. The current gear, i.e. the current transmission ratio, prior to the gear shift operation is known and used as input to the reference input model, i.e. as input for determining the torque development course and engine speed course. Data for the driveline for the specific vehicle comprising which kind of transmission/gearbox, moment of inertia of the engine, rear axle ratio, wheel radius and certain calibrated strategies for the gear shift operation are according to an embodiment also known and used as input to the reference input model, i.e. as input for determining the torque development course and engine speed course.

According to an embodiment the method further comprises the step of controlling engine operation based upon one or more of said engine operation parameter values determined by means of said engine operation simulation model for controlling emissions and/or improving efficiency and/or improving drivability. Hereby improved engine operation is obtained.

According to an embodiment of the method an exhaust gas smoke limiting function of a combustion engine control system of a vehicle is considered by said engine operation simulation model, the step of controlling engine operation further comprising the step of determining an available engine torque corresponding to activation of limitation of engine torque provided by said exhaust gas smoke limiting function based on a determined boost pressure in connection to gear shift engagement. Hereby a more accurate basis for the gear shift operation is provided such that the correct gear is chosen prior to the gear shift operation.

The method and the method steps described above with reference to FIG. 7 are according to an embodiment performed with the system I according to FIG. 4.

The inventive method, and embodiments thereof, as described above, may at least in part be performed with/using/by at least one device. The inventive method, and embodiments thereof, as described above, may be performed at least in part with/using/by at least one device that is suitable and/or adapted for performing at least parts of the inventive method and/or embodiments thereof. A device that is suitable and/or adapted for performing at least parts of the inventive method and/or embodiments thereof may be one, or several, of a control unit, an electronic control unit (ECU), an electronic circuit, a computer, a computing unit and/or a processing unit.

With reference to the above, the inventive method, and embodiments thereof, as described above, may be referred to as an, at least in part, computerised method. Said method being, at least in part, computerised meaning that it is performed at least in part with/using/by said at least one device that is suitable and/or adapted for performing at least parts of the inventive method and/or embodiments thereof.

With reference to the above, the inventive method, and embodiments thereof, as described above, may be referred to as an, at least in part, automated method. Said method being, at least in part, automated meaning that it is performed with/using/by said at least one device that is suitable and/or adapted for performing at least parts of the inventive method and/or embodiments thereof.

Figure 8:
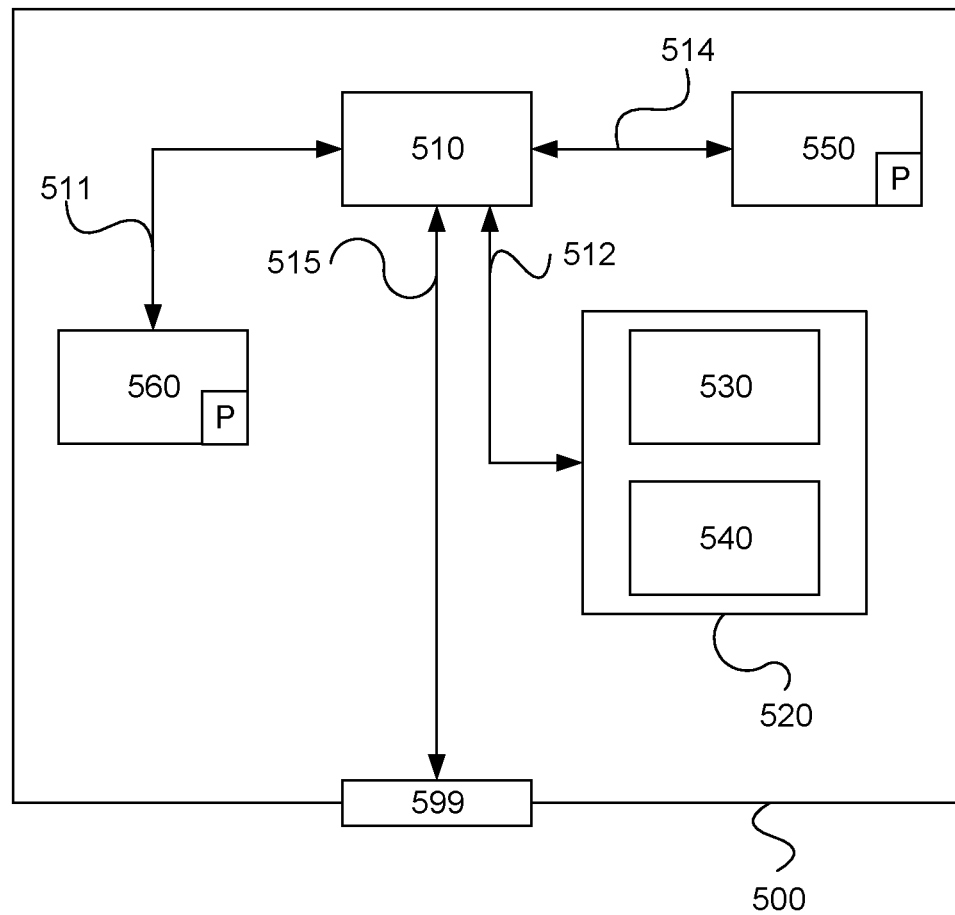
FIG. 8 schematically illustrates a computer according to an embodiment of the present invention.

With reference to FIG. 8, a diagram of an apparatus 500 is shown. The system I described with reference to FIG. 4 may according to an embodiment comprise apparatus 500. Apparatus 500 comprises a non-volatile memory 520, a data processing device 510 and a read/write memory 550. Non-volatile memory 520 has a first memory portion 530 wherein a computer program, such as an operating system, is stored for controlling the function of apparatus 500. Further, apparatus 500 comprises a bus controller, a serial communication port, I/O-means, an A/D-converter, a time date entry and transmission unit, an event counter and an interrupt controller (not shown). Non-volatile memory 520 also has a second memory portion 540.

A computer program P is provided comprising routines for determining engine operation parameter values during and/or after a gear shift operation prior to performing said gear shift operation. The program P comprises routines for determining initial conditions comprising torque demand and engine speed and certain other engine operation parameter values. The program P comprises routines for providing said initial conditions to an engine operation simulation model. The program P comprises routines for providing a torque development course as well as an engine speed development course during the intended gear shift operation to said engine operation simulation model. The program P comprises routines for determining desired engine operation parameter values by means of said engine operation simulation model based upon the information thus provided to said engine operation simulation model. The initial conditions determined for said certain other engine operation parameter values comprises any of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions. The desired engine operation parameter values determined by means of said engine operation simulation model comprises any of: boost pressure, exhaust gas pressure, turbine speed, compressor speed and exhaust gas temperature. The program P comprises routines for determining the said torque development course and said engine speed development course during the intended gear shift operation based on said initial conditions for torque demand and engine speed and initial conditions for certain other engine operation parameter values comprising current gear. The program P comprises routines for controlling engine operation based upon one or more of said engine operation parameter values determined by means of said engine operation simulation model for controlling emissions and/or improving efficiency and/or improving drivability. The routines for controlling engine operation comprises routines for determining an available engine torque corresponding to activation of limitation of engine torque provided by an exhaust gas smoke limiting function based on a determined boost pressure in connection to gear shift engagement. The computer program P may be stored in an executable manner or in a compressed condition in a separate memory 560 and/or in read/write memory 550.

When it is stated that data processing device 510 performs a certain function it should be understood that data processing device 510 performs a certain part of the program which is stored in separate memory 560, or a certain part of the program which is stored in read/write memory 550.

Data processing device 510 may communicate with a data communications port 599 by means of a data bus 515. Non-volatile memory 520 is adapted for communication with data processing device 510 via a data bus 512. Separate memory 560 is adapted for communication with data processing device 510 via a data bus 511. Read/write memory 550 is adapted for communication with data processing device 510 via a data bus 514. To the data communications port 599 e.g. the links connected to the control units 100 may be connected.

When data is received on data port 599 it is temporarily stored in second memory portion 540. When the received input data has been temporarily stored, data processing device 510 is set up to perform execution of code in a manner described above. The signals received on data port 599 can be used by apparatus 500 for determining engine operation parameter values during and/or after a gear shift operation prior to performing said gear shift operation. The signals received on data port 599 can be used by apparatus 500 for determining initial conditions comprising torque demand and engine speed and certain other engine operation parameter values. The signals received on data port 599 can be used by apparatus 500 for providing said initial conditions to an engine operation simulation model. The signals received on data port 599 can be used by apparatus 500 for providing a torque development course as well as an engine speed development course during the intended gear shift operation to said engine operation simulation model. The signals received on data port 599 can be used by apparatus 500 for determining desired engine operation parameter values by means of said engine operation simulation model based upon the information thus provided to said engine operation simulation model. The initial conditions determined for said certain other engine operation parameter values comprises any of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions. The desired engine operation parameter values determined by means of said engine operation simulation model comprises any of: boost pressure, exhaust gas pressure, turbine speed, compressor speed and exhaust gas temperature. The signals received on data port 599 can be used by apparatus 500 for determining said torque development course and said engine speed development course during the intended gear shift operation based on said initial conditions for torque demand and engine speed and initial conditions for certain other engine operation parameter values comprising current gear. The signals received on data port 599 can be used by apparatus 500 for controlling engine operation based upon one or more of said engine operation parameter values determined by means of said engine operation simulation model for controlling emissions and/or improving efficiency and/or improving drivability. The used by apparatus 500 for controlling engine operation comprises used by apparatus 500 for determining an available engine torque corresponding to activation of limitation of engine torque provided by an exhaust gas smoke limiting function based on a determined boost pressure in connection to gear shift engagement.

Parts of the methods described herein can be performed by apparatus 500 by means of data processing device 510 running the program stored in separate memory 560 or read/write memory 550. When apparatus 500 runs the program, parts of the methods described herein are executed.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for determining engine operation parameter values during and/or after a gear shift operation prior to performing said gear shift operation, comprising, prior to the gear shift operation:
   - determining initial conditions comprising at least torque demand and engine speed;
   - providing said initial conditions to an engine operation simulation model;
   - providing a torque development course, as well as an engine speed development course during the intended gear shift operation to said engine operation simulation model; and
   - determining desired engine operation parameter values by means of said engine operation simulation model based upon the information thus provided to said engine operation simulation model.

2. A method according to claim 1, wherein said determining initial conditions further comprises determining at least one of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

3. A method according to claim 1, wherein said desired engine operation parameter values determined by means of said engine operation simulation model comprises at least one of: boost pressure, exhaust gas pressure, turbine speed, compressor speed and exhaust gas temperature.

4. A method according to claim 1, wherein said torque development course and said engine speed development course during the intended gear shift operation are determined prior to said gear shift operation based at least on said initial conditions for torque demand and engine speed and current gear.

5. A method according to claim 1, further comprising the step of controlling engine operation based upon one or more of said engine operation parameter values determined by means of said engine operation simulation model for controlling emissions and/or improving efficiency and/or improving drivability.

6. A method according to claim 5, wherein an exhaust gas smoke limiting function of a combustion engine control system of a vehicle is considered by said engine operation simulation model, the step of controlling engine operation further comprising the step of determining an available engine torque corresponding to activation of limitation of engine torque provided by said exhaust gas smoke limiting function based on a determined boost pressure in connection to gear shift engagement.

7. A system for determining engine operation parameter values during and/or after a gear shift operation prior to performing said gear shift operation, said system comprising:
- means for determining initial conditions prior to the gear shift operation, said initial conditions comprising at least torque demand and engine speed;
- means for providing said initial conditions to an engine operation simulation model;
- means for providing a torque development course as well as an engine speed development course during the intended gear shift operation to said engine operation simulation model; and
- means for determining desired engine operation parameter values by means of said engine operation simulation model based upon the information thus provided to said engine operation simulation model.

8. A system according to claim 7, wherein said means for determining initial conditions further determines at least one of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

9. A system according to claim 7, wherein said desired engine operation parameter values determined by means of said engine operation simulation model comprises at least one of: boost pressure, exhaust gas pressure, turbine speed, compressor speed and exhaust gas temperature.

10. A system according to claim 7, comprising means for determining said torque development course and said engine speed development course during the intended gear shift operation prior to said gear shift operation based at least on said initial conditions for torque demand and engine speed and current gear.

11. A system according to claim 7, further comprising means for controlling engine operation based upon one or more of said engine operation parameter values determined by means of said engine operation simulation model for controlling emissions and/or improving efficiency and/or improving drivability.

12. A system according to claim 11, wherein an exhaust gas smoke limiting function of a combustion engine control system of a vehicle is arranged to be considered by said engine operation simulation model, the means for controlling engine operation further comprising means for determining an available engine torque corresponding to activation of limitation of engine torque provided by said exhaust gas smoke limiting function based on a determined boost pressure in connection to gear shift engagement.

13. A vehicle comprising a system for determining engine operation parameter values during and/or after a gear shift operation prior to performing said gear shift operation, said system comprising:
- means for determining initial conditions prior to the gear shift operation, said initial conditions comprising at least torque demand and engine speed;
- means for providing said initial conditions to an engine operation simulation model;
- means for providing a torque development course as well as an engine speed development course during the intended gear shift operation to said engine operation simulation model; and
- means for determining desired engine operation parameter values by means of said engine operation simulation model based upon the information thus provided to said engine operation simulation model.

14. A vehicle according to claim 13, wherein said means for determining initial conditions further determines at least one of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

15. A vehicle according to claim 13, wherein said desired engine operation parameter values determined by means of said engine operation simulation model comprises at least one of: boost pressure, exhaust gas pressure, turbine speed, compressor speed and exhaust gas temperature.

16. A vehicle according to claim 13, comprising means for determining said torque development course and said engine speed development course during the intended gear shift operation prior to said gear shift operation based at least on said initial conditions for torque demand and engine speed and-current gear.

17. A computer program product comprising computer program code stored on a non-transitory computer-readable medium, said computer program product for determining engine operation parameter values during and/or after a gear shift operation prior to performing said gear shift operation, said computer program product comprising computer instructions to cause one or more computer processors to perform the following operations prior to the gear shift operation:
- determining initial conditions comprising at least torque demand and engine speed;
- providing said initial conditions to an engine operation simulation model;
- providing a torque development course, as well as an engine speed development course during the intended gear shift operation to said engine operation simulation model; and
- determining desired engine operation parameter values by means of said engine operation simulation model based upon the information thus provided to said engine operation simulation model.

18. A computer program product according to claim 17, wherein said determining initial conditions further determines at least one of: current gear, ambient temperature, boost pressure, boost temperature, air mass flow, exhaust gas pressure, exhaust gas temperature, exhaust gas mass flow, turbine speed, compressor speed, engine temperature, engine operation losses, and actuator positions.

19. A computer program product according to claim 17, wherein said desired engine operation parameter values determined by said engine operation simulation model comprises at least one of: boost pressure, exhaust gas pressure, turbine speed, compressor speed and exhaust gas temperature.

20. A computer program product according to claim 17, wherein said torque development course and said engine speed development course during the intended gear shift operation are determined prior to said gear shift operation based at least on said initial conditions for torque demand and engine speed and current gear.

* * * * *